Figure 1:
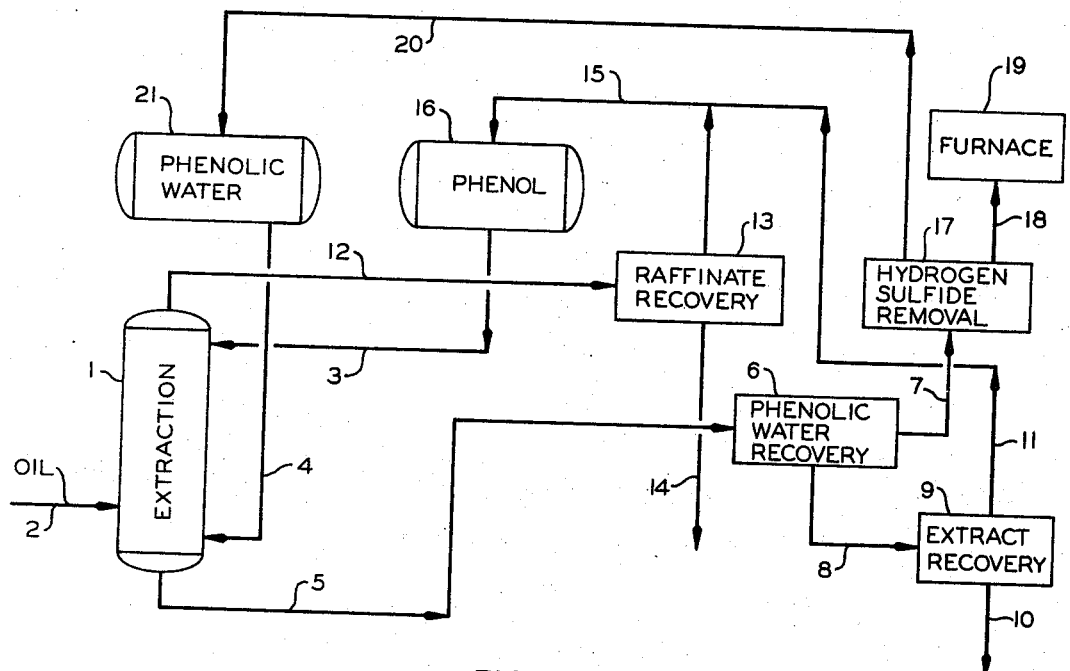

INVENTORS
N. G. MILLER
T. W. OLSON
BY
ATTORNEYS

United States Patent Office 3,329,606
Patented July 4, 1967

3,329,606
METHOD FOR REFINING A PHENOLIC WATER SOLVENT
Norman G. Miller, Shawnee Mission, Kans., and Theodore W. Olson, Parkville, Mo., assignors to Phillips Petroleum Company, a corporation of Delaware
Filed Aug. 30, 1965, Ser. No. 483,661
5 Claims. (Cl. 208—321)

This invention relates to solvent refining. In one of its aspects, this invention relates to a method of rendering a solvent used in a solvent refining process free of impurities by removing the impurities therefrom without chemical treatment or the use of additives by stripping with a gas or vapor. In another aspect, this invention relates to a new method for treating a solvent stream containing impurities which is customarily treated by the addition of additives to effect chemical change thereof, comprising removing the impurities from the solvent stream employng a physical stripping medium. In still another aspect, this invention relates to an apparatus for treating a solvent stream to remove impurities therefrom.

In many prior art methods for solvent refining or solvent extraction, undesirable materials which are formed in the solvent or are added to the solvent in the extraction process, or in any other way, are treated in the solvent by the addition of other materials which can react chemically with the undesirable materials to render them unharmful in the system. As an example, in the phenol extraction of lubricating oils, hydrogen sulfide is often formed in the system. When this hydrogen sulfide is allowed to build up in various process equipment, corrosion takes place, forming iron sulfide solids which cause deleterious effects in the process. For example, the iron sulfide solids formed interfere with efficient settling in the extraction column, reducing column capacity and increasing solvent requirements. This, in turn, increases utilities expense for phenol recovery and increases phenol consumption. In addition, the solids formed reduce heat exchange efficiency, further raising utilities expense. They may also deposit in piping, thereby increasing friction losses and increasing maintenance expense by damaging pumps, seals, and eroding of furnace tubes. One prior art method for solving these problems has been to add barium and calcium compounds into the system to reduce the formation of iron sulfides by forming salts that were soluble in phenol. However, this prior art method has its disadvantage in that additional expense and inconvenience are occasioned when additional materials have to be inserted into the process streams.

By various aspects of this invention, one or more of the following or other objects can be obtained. It is an object of this invention to render a solvent stream in a solvent extraction of a refining process free of deleterious materials. Another object of this invention is to economically remove materials from a solvent process stream. Still another object of this invention is to adapt a removal apparatus to existing solvent treating equipment. Another object of this invention is to economically utilize existing process streams to remove deleterious materials from a solvent treatment process.

Other aspects, objects, and the several advantages of this invention are apparent from a study of this disclosure, the drawing and the appended claims.

In accordance with the practice of this invention, there is provided a method of rendering a solvent used in a solvent refining or extraction process free of impurities by physically removing the impurities therefrom by stripping with a gas such as, for example, natural gas or air. The invention also relates to the novel means which can be combined with existing apparatus to form a combination of means for removing impurities from a solvent used in a solvent extraction process by stripping with a gas and recycling the solvent to the solvent extraction process.

Figure 2:
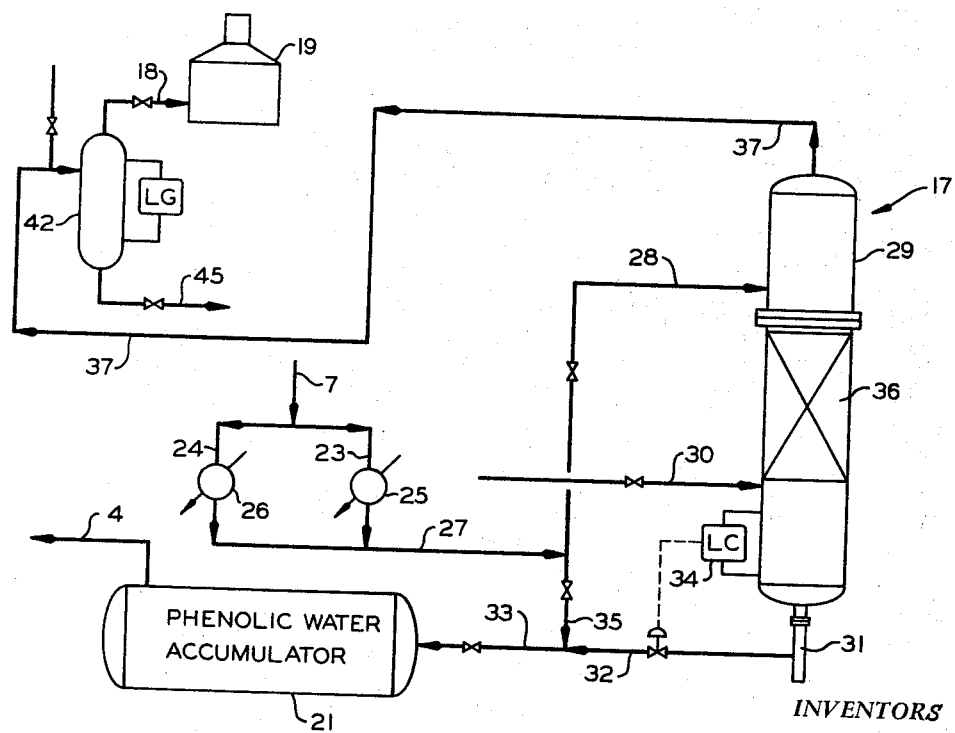

The invention will be more fully described with reference to the drawings in which:
FIGURE 1 is a schematic diagram for solvent refining or extraction in accordance with this invention, and;
FIGURE 2 is a diagram of a preferred impurities' removal means in accordance with this invention.

Referring now to FIGURE 1, the drawing will be described with reference to the phenol extraction of a lubricating oil charge in an extraction column. The feed stock, which can, for example, be lube oil, is introduced in extraction column 1 via conduit 2. Phenol is introduced near the top of column 1 via conduit 3, and phenolic water is introduced near the bottom of column 1 via conduit 4. An enriched extract is taken from the bottom of column 1 via conduit 5 and introduced into phenolic water recovery system 6. In the phenolic water recovery system, the extract is separated into phenolic water and a mixture of oil and phenol. The phenolic water is removed from the phenolic water recovery system via conduit 7. The resulting phenol and oil mixture is transported via conduit 8 to extract recovery system 9, wherein the large amounts of phenol included in the phenol and oil mixture are removed and the oil is withdrawn from the system via conduit 10. Phenol is withdrawn from the extract recovery system 9 by conduit 11.

A raffinate phase containing phenol and oil is withdrawn from extraction column 1 by conduit 12 and introduced into raffinate recovery system 13. In raffinate recovery system 13, the raffinate is divided into oil and phenol portions, the oil being removed by conduit 14 from the system, and the phenol passing from raffinate recovery system 13 by conduit 15 to phenol drum 16.

Phenolic water in conduit 7 is introduced into hydrogen sulfide removal system 17, wherein hydrogen sulfide formed in the phenolic water by various operations in the process is substantially completely removed. Hydrogen sulfide passes from the removal system 17 by conduit 18 to a suitable disposal means such as furnace 19. The phenolic water, which is now free of impurities, passes by conduit 20 and is stored in phenolic water drum 21.

If necessary, or desirable, an additional hydrogen sulfide removal system can be installed between raffinate recovery system 13 and phenol drum 16. The purpose of this hydrogen sulfide removal system would be to remove hydrogen sulfide formed in the phenol to provide a solvent substantially free of impurities in phenol drum 16.

Although hydrogen sulfide removal system 17 can be any system capable of substantially removing completely hydrogen sulfide from the phenolic water which is returned to phenolic water drum 21, a presently preferred embodiment of this system is a gas contact system for removal of impurities such as that shown in FIGURE 2. In addition to stripping with natural gas which is described in connection with FIGURE 2, other gaseous materials can be used as a stripping medium, for example, steam, air, etc.

FIGURE 2 depicts a preferred embodiment of the hydrogen sulfide removal system shown as element 17 in FIGURE 1. Phenolic water as vapor from phenolic water recovery system 6 is introduced at conduit 7. The vaporous phenolic water can be divided into two streams, if necessary, and pass by conduits 23 and 24 to heat exchangers 25 and 26. After the phenolic water vapor has been condensed, the streams are recombined in conduit 27. The condensed phenolic water in conduit 27 is conducted by conduit 28 to an upper portion of tower 29.

A stripping gas which is preferably natural gas is introduced into a lower portion of column 29 by conduit 30. The stripping gas is countercurrently contacted with the phenolic water, whereby $H_2S$ is removed from the phenolic water.

Stripped phenolic water from stripping tower 29 is removed by conduit 31 and passed through conduit 32 and 33 into phenolic water accumulator 21. The level in the bottom of stripping tower 29 can be controlled by liquid level control 34 actuating the valve in conduit 32.

If, for some reason, it is desired that the phenolic water be not introduced into column 29, the phenolic water can be routed past the column by conduit 35.

If desired, a packing or contact material can be used in column 29. This material is designated as element 36. Various contact materials can be used, such as helices, rings, ceramic saddles, etc. The primary function of the packing material is to effect intimate contact between the phenolic water and the stripping gas.

The stripping gas containing $H_2S$ is carried overhead from column 29 by conduit 37 and the overhead passed to vessel 42. In vessel 42, any carried over moisture from the stripping column 29 is separated. The $H_2S$ enriched gas which is separated from the moisture is passed by conduit 18 to extract furnace 19. Moisture from vessel 42 can be withdrawn by conduit 45 where it is directed to further processing, if necessary.

The following specific example will serve to illustrate more particularly the operation of the invention in accordance with FIGURES 1 and 2.

Example

Phenolic water from phenolic water recovery system 6 in FIGURE 1 was introduced to stripping column 29 by conduit 28 at a rate of 21,000 lbs./hr. Column 29 utilized a packing 36 comprising 8′9″ of 1-inch ceramic berl saddles, over which was located a distributor tray. Natural gas having an average molecular weight of about 20 was introduced through column 30 at a rate of 400 s.c.f.h. Stripped phenolic water was taken from column 29 by conduits 31, 32, and 33 and returned to phenolic water drum 21 of FIGURE 1. Natural gas containing $H_2S$ was passed from tower 29 by conduit 37 to extract furnace 19. Intermediate conduit 37 and extract furnace 19, the natural gas was passed through vessel 42 and conduit 18. A typical analysis of the material in conduit 37 is shown in Table I.

TABLE I

| | Lbs./hr. | Mol. wt. | Moles/hr. | S.c.f.h. |
|---|---|---|---|---|
| GSC Gas* | 21.14 | 20 | 1.057 | 400 |
| Phenol | 0.98 | 94 | 0.0104 | |
| Water | 6.06 | 18 | 0.3366 | |
| Total | 28.18 | 20 | 1.404 | 533 |

*Gas Service Company Gas comprising: $H_2$, $CH_4$, $C_2H_6$.

The effectiveness of the stripping of the phenolic water is illustrated by the fact that prior to the installation of stripping tower 29 in the phenolic extraction system, the $H_2S$ content in the phenolic water averaged 200 parts per million. Following the installation of stripping column 29 to the phenol extraction system, the average $H_2S$ content in the phenolic water averaged 9 parts per million.

The packing in the foregoing example in column 29 represents the equivalent of about 7 theoretical plates. The dimension of tower 29 was approximately 20″ x 26′. The top temperature and pressure, respectively, in tower 29 are 150° F. and about 15 p.s.i.a.

Reasonable variation and modification are possible within the scope of the disclosure, the drawing, and the appended claims to the invention, the essence of which is that there has been provided a method and apparatus for rendering a solvent used in a solvent refining process free of impurities by physically removing the impurities therefrom without chemical treatment or the use of additives employing a stripping medium such as a gas or vapor.

We claim:
1. The method of extracting oil with phenol comprising
    (a) introducing oil, phenol, and water to an extraction zone;
    (b) recovering an extract stream from said extraction zone containing oil, water, and phenolic water; and recovering a raffinate stream from said extraction zone containing phenol and oil;
    (c) separating said phenolic water from said extract stream;
    (d) removing impurities from said separated phenolic water by stripping said phenolic water with a gas;
    (e) separating phenol from said raffinate stream; and
    (f) recycling said phenol and said purified phenolic water to said extraction zone.
2. The method of claim 1 wherein said stripping medium is air.
3. The method of claim 1 wherein said stripping medium is natural gas.
4. The method of claim 1 wherein said stripping medium is purified natural gas.
5. The method of claim 1 further comprising the step of removing impurities from the phenol separated from said raffinate stream by contacting said phenol with a stripping medium.

References Cited

UNITED STATES PATENTS

| 2,104,401 | 1/1930 | Murphree et al. | 208—321 |
| 2,312,912 | 3/1943 | Kiersted | 208—321 |
| 2,673,174 | 3/1954 | King | 208—321 |
| 2,846,354 | 8/1958 | Holm et al. | 208—321 |
| 2,923,680 | 2/1960 | Bushnell | 208—321 |
| 3,209,047 | 9/1965 | Young | 208—324 |

DELBERT E. GANTZ, *Primary Examiner.*

H. LEVINE, *Assistant Examiner.*